July 18, 1933.  S. G. BAITS  1,918,445
ANTISHIMMY DEVICE
Filed Sept. 19, 1931   2 Sheets-Sheet 1
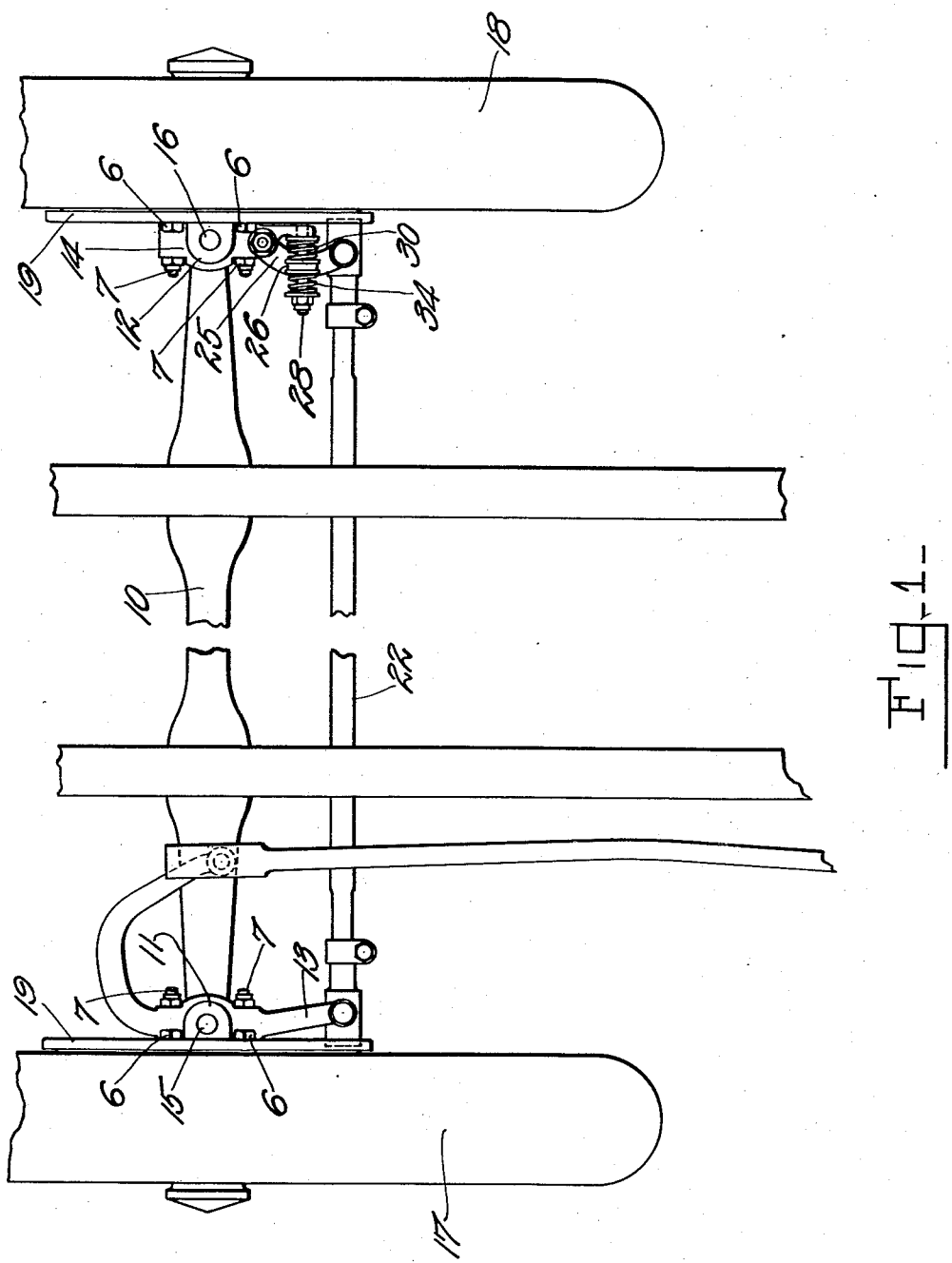

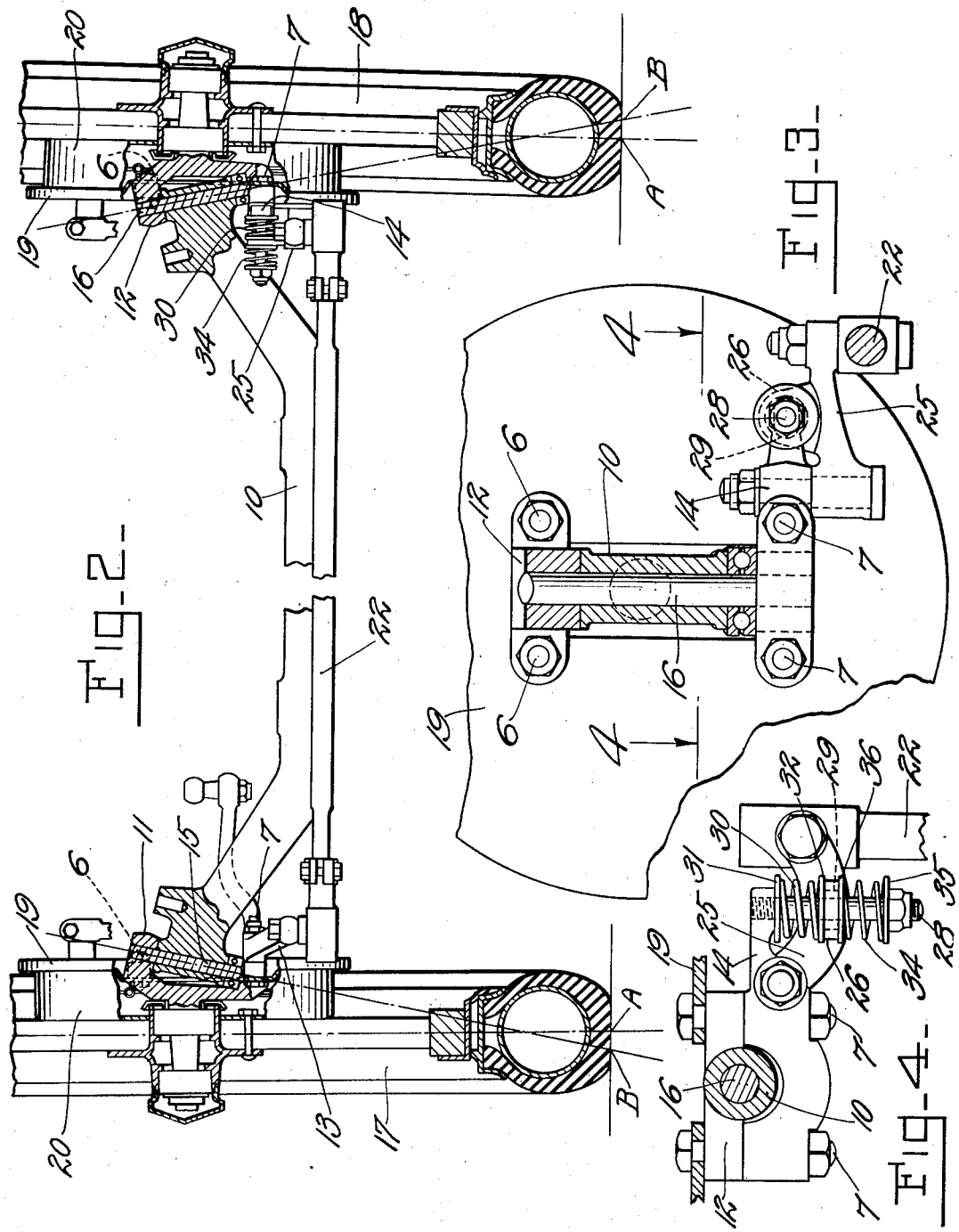

Patented July 18, 1933

1,918,445

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

ANTISHIMMY DEVICE

Application filed September 19, 1931. Serial No. 563,726.

This invention relates to motor vehicles and more particularly to a construction and arrangement for the pivotally mounted wheels which control the direction of movement of the vehicle.

One pair of the wheels of a motor vehicle are mounted so that the driver may swing them transversely to control the direction of movement of the vehicle. For this purpose these wheels are carried by steering knuckles which are pivotally mounted on pins carried near opposite ends of one axle. The steering knuckles are connected together and one is connected to the drag link of the steering mechanism. Since four-wheel brakes and balloon tires have been adopted considerable trouble has been experienced due to the tendency for the steering wheels to shimmy. Constructions adopted to overcome this tendency have developed other troubles, particularly lack of control of the steering mechanism while applying the vehicle brakes.

It is an object of the invention to provide a construction for reducing the tendency for the steering wheels to shimmy.

It is another object of the invention to provide a construction which will reduce the tendency for the steering wheels to shimmy and which will render the steering mechanism controllable particularly when applying the brakes.

The invention will be more clearly understood from the following description in conjunction with the accompanying drawings: in which;

Fig. 1 is a plan view of the front wheel assembly of a motor vehicle;

Fig. 2 is an elevational view of the same, partly in section;

Fig. 3 is a fragmentary detail view, partly in section, of one of the parts; and Fig. 4 is a sectional view taken upon the line 4—4 of Fig. 3.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

One embodiment of the invention is illustrated in the accompanying drawings and comprises an axle 10 having steering spindles or knuckles 11 and 12 pivotally mounted upon pivot pins 15 and 16 carried by the axle near opposite ends thereof. The wheels 17 and 18 are rotatably carried upon the steering spindles 11 and 12 respectively. The backing plate 19 of a wheel brake 20 is suitably secured to each of the knuckles 11 and 12, as by bolts 6 and 7. Arms 13 and 14 extend rearwardly from the knuckles 11 and 12 respectively and are rigidly secured thereto by the bolts 7, thereby forming part of the knuckles. One end of a tie rod 22 is suitably secured in the usual manner to the end of the arm 13. The other end of the tie rod is pivotally connected to one end of an arm 25, the other end of which is pivotally secured to the arm 14. A lug 26 extends upwardly from the arm 25 intermediate the ends thereof. A bolt 28 passing freely through an opening 29 in the lug 26 is threaded in the arm 14. A spring 30 surrounds the bolt 28 with one end in engagement with a washer 31 abutting the knuckle 12 and the other end in engagement with a washer 32 abutting the lug 26. A spring 34 also surrounds the bolt 28 with one end in engagement with a washer 35 abutting the head of the bolt 28 and the other end in engagement with a washer 36 abutting the lug 26.

The points of intersection of the axes of the king pins with the ground, lie outside the points A which are the center of pressure of the tire on the ground. When the brakes are applied the momentum of the car tends to carry the points B forward, while the friction of the tire with the ground tends to retard the movement of the patent A. There is, therefore, a tendency for both wheels to be turned inward, that is, to toe in. If there is a tendency to toe out on the other hand as would be the case if the positions A and B were reversed there would be a strong tendency for the wheels to guide the car to the right because the left wheel in a car having a left-hand steering wheel is held more firmly than the right wheel, while the right wheel is freer to move. If the points A and B coincide, there is no strong tendency to swing the wheel in either direction and therefore the wheel oscillates easily back and forth. By arranging the parts as illustrated a tendency to toe in is produced which is resisted only by the stiff spring 34. The tendency to toe out, however, is resisted by the soft spring 30 with the result that all the parts tend to maintain substantially ideal conditions. I find in practice that the arrangements embodying my invention substantially eliminate shimmy trouble.

I claim:

1. In combination, a vehicle axle, a pair of wheels, a pair of steering knuckles each rotatably receiving one of said wheels, a pair of pins carried by said axle each rotatably receiving one of said knuckles, said pins being so arranged with respect to said wheels that the projections of the axes of said pins intersect the areas of contact of said wheels with the surface supporting the vehicle at points spaced from and on opposite sides of the centers of said contact areas, whereby said wheels tend to move transversely in predetermined opposite directions, a connection between said knuckles permitting limited transverse movement of one of said wheels relative to the other including resilient means acting more forcibly in one direction than the other.

2. In combination, a vehicle axle, a pair of wheels, a pair of steering knuckles each rotatably supporting one of said wheels, a pair of pins carried by said axle each rotatably receiving one of said knuckles, the projections of the axes of said pins intersecting the areas of contact of said wheels and the surface supporting the vehicle outside the centers of said contact areas, a connection between said knuckles permitting limited transverse movement of one of said wheels relative to the other including resilient means acting more forcibly in one direction than the other.

3. In combination, a vehicle axle, a pair of wheels, a pair of steering knuckles each rotatably receiving one of said wheels, a pair of pins carried by said axle each rotatably supporting one of said knuckles, said pins being so arranged with respect to said wheels that the projections of the axes of said pins intersect the areas of contact of said wheels with the surface supporting the vehicle at points spaced from and on opposite sides of the centers of said contact areas, whereby said wheels tend to move transversely in predetermined opposite directions, a connection between said knuckles permitting limited independent transverse movement of said wheels including resilient means resisting said transverse movement.

4. In combination, a vehicle axle, a pair of wheels, a pair of steering knuckles each rotatably receiving one of said wheels, a pair of pins carried by said axle each rotatably supporting one of said knuckles, the projections of the axes of said pins intersecting the areas of contact of said wheels and the surface supporting the vehicle outside the centers of said areas, a connection between said knuckles permitting limited independent transverse movement of said wheels including resilient means resisting said transverse movement.

5. In combination, a vehicle axle, a pair of wheels, a pair of steering knuckles each rotatably supporting one of said wheels, a pair of pins carried by said axle each rotatably receiving one of said knuckles, the projections of the axes of said pins intersecting the areas of contact of said wheels and the surface supporting the vehicle outside the centers of said contact areas, a tie rod connecting said knuckles, one of said knuckles being formed of at least two parts pivotally connected to permit limited relative movement and held in their normal positions by oppositely acting resilient members, one of said members acting more forcibly than the other.

6. In combination, a vehicle axle, a pair of steering knuckles, wheels mounted on said steering knuckles, king pins for the steering knuckles, the projections of the axes of said pins intersecting the ground at points outside the centers of contact of the surface supporting the vehicle, connections between said knuckles permitting limited independent movement of the wheels about the king pins, and resilient means resisting said independent movement in both directions, the means resisting the tendency to toe out being weaker than that resisting the tendency to toe in.

STUART G. BAITS.